T. H. M. VAN SWIETEN.
GEARING.
APPLICATION FILED FEB. 10, 1909.

927,385.

Patented July 6, 1909.

Witnesses:
Ewd L. Folson
Edward N. Sarton

Inventor:
Theodorus H. M. van Swieten,
By Spear, Middleton, Donaldson & —
attys.

T. H. M. VAN SWIETEN.
GEARING.
APPLICATION FILED FEB. 10, 1909.
927,385.
Patented July 6, 1909.
2 SHEETS—SHEET 2.
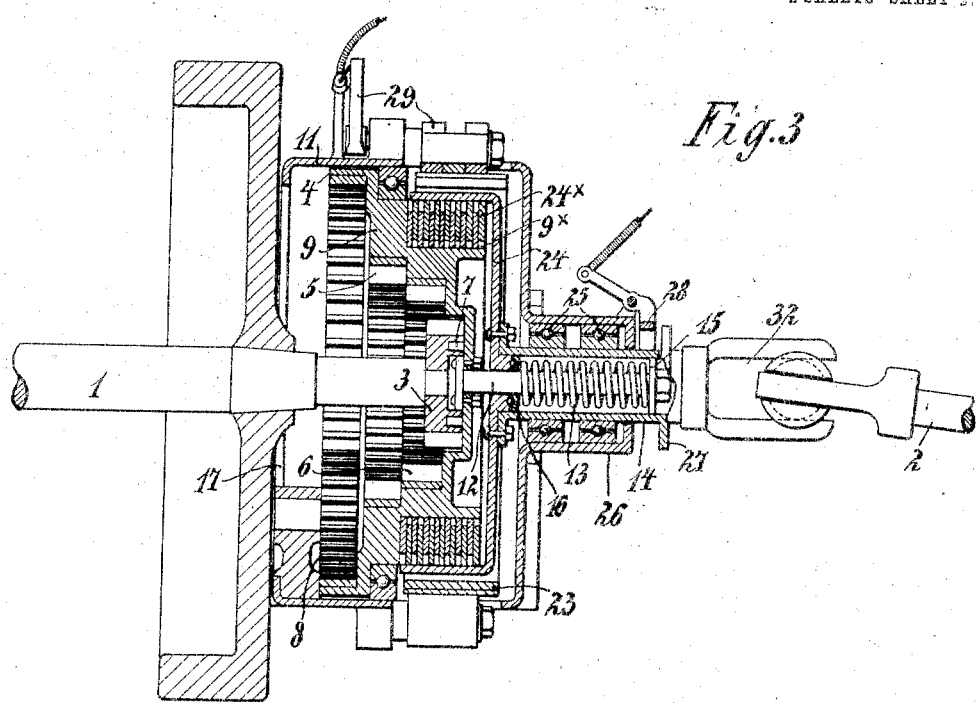
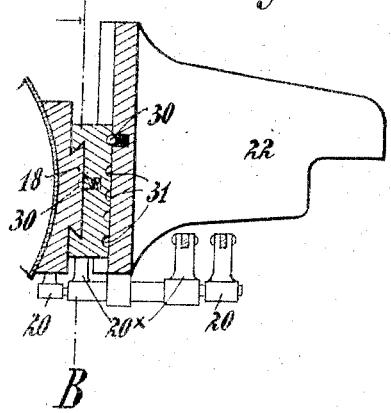
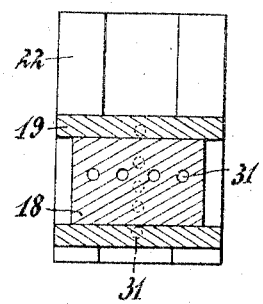
Witnesses:
Inventor:
Theodorus H. M. van Swieten

UNITED STATES PATENT OFFICE.

THEODORUS H. M. VAN SWIETEN, OF HILVERSUM, NEAR AMSTERDAM, NETHERLANDS.

GEARING.

No. 927,385.   Specification of Letters Patent.   Patented July 6, 1909.

Application filed February 10, 1909. Serial No. 477,163.

*To all whom it may concern:*

Be it known that I, THEODORUS HENDRICUS MARIA VAN SWIETEN, a subject of the Queen of the Netherlands, and residing at Hilversum, near Amsterdam, Netherlands, have invented certain new and useful Improvements in Gearing, of which the following is a description.

The present invention relates to the change speed and reversing gearing as also to the brake mechanism of motor cars and its object is to construct these parts in such manner that they will be very compact and that all parts are contained in a housing which is so small that a reserve gearing may be taken with the car and in the event of anything in connection with these parts breaking down, the whole device may be taken out of the car and the reserve one fixed up in a very short time, by simply manipulating a few screws. This object is attained by making the driving shaft with its pinion stationary, i. e. to run in stationary bearings and by mounting the change speed gearing as also the reversing gearing and the brake and unclutching device in a housing to which is imparted by means of any known lever system a motion toward and from the driving pinion as also laterally as regards the same, the opposite end of the driven shaft in the housing being connected up to the motor wheel shaft in the usual manner by means of a universal joint.

In order to render the present specification easily intelligible reference is had to the accompanying drawing in which similar numerals of reference denote similar parts throughout the several parts.

Figure 1:
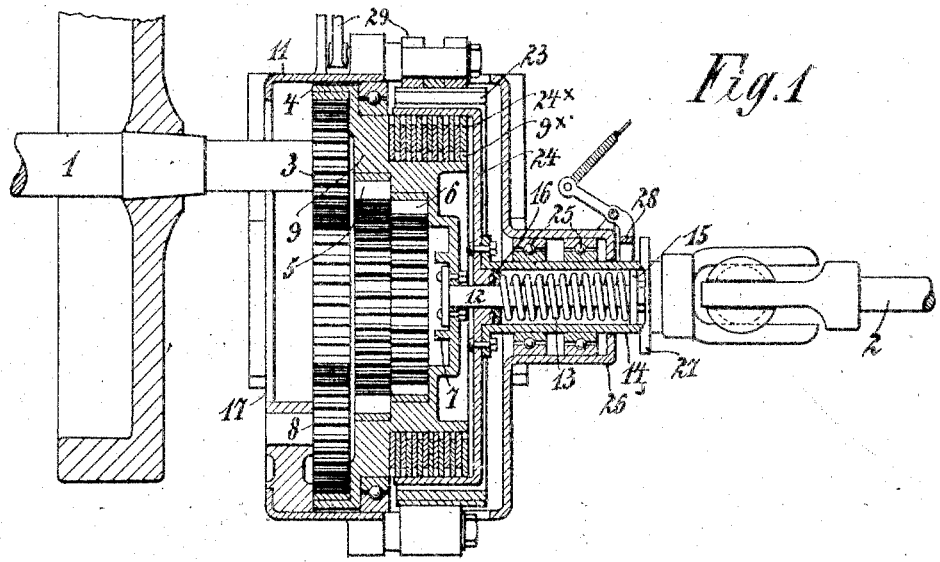
Figure 2:
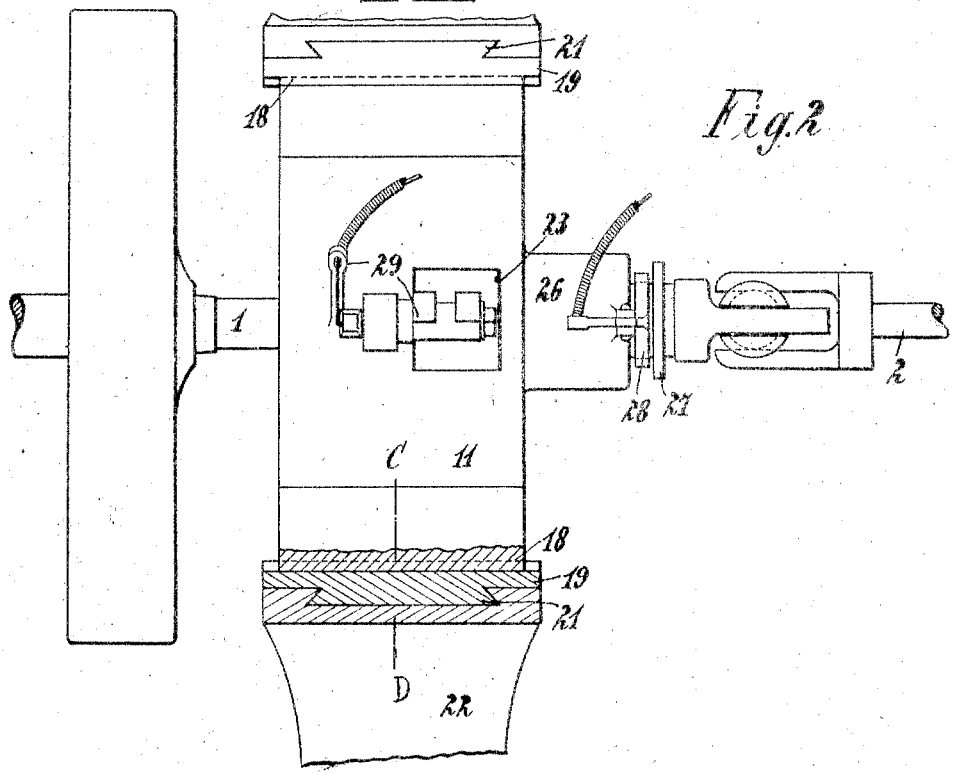

Figure 1 is a horizontal section through the device, Fig. 2 is a plan of the same, Fig. 3 a similar section to Fig. 1 showing the parts engaged for a different speed, Fig. 4 is a section on line C—D of Fig. 2 and Fig. 5 is a section on line A—B of Fig. 4.

The motor shaft 1 is mounted in stationary bearings and carries the usual fly-wheel as also the pinion 3, which extends into a housing 11, adapted to carry all the other parts of the gearing. A hollow body 9 is rotatably mounted in the housing 11 and is provided with the interior rings of teeth 4, 5, 6 and the coupling claw 7. A pinion 8 is mounted in the housing 11 which is in engagement with the ring of teeth 4 and when engaged by the pinion 3 will reverse the direction of rotation of the driven shaft, while when the said pinion 3 is in engagement with either of the rings of teeth 4, 5 or 6, the motor will be driven at a quarter, half or one third full speed or at the same speed as that of the driving shaft 1, when the coupling claw 7 of the body 9 is in engagement with the said pinion (Fig. 3). The end of the hollow body 9 carries on its exterior a series of frictional coupling rings $9^\times$ which alternate with coupling rings $24^\times$ which are keyed to the coupling sleeve 24. This coupling sleeve is bolted to a cylindrical extension 14 and incloses the rear part of the hollow body 9.

A rod 12 is screwed to the center of the body 9 extending rearwardly and carrying a disk 15 secured to its end by means of a nut. The said rod extends into the cylinder 14 and carries a spring 13 which lies between the disk 15 and a disk 16 at the opposite end of the rod which latter disk is adapted to run on the coupling sleeve 24 by means of a set of ball bearings. The coupling sleeve 24 with its cylinder 14 is firmly fixed to one member of the universal joint connecting up the driven shaft 2. The spring 13 serves to normally hold the coupling rings $9^\times$ and $24^\times$ in engagement i. e. it keeps the driven shaft coupled to the driving shaft. The cylinder 14 extends through the end of the cylindrical extension 26 of the housing 11 and is provided with a collar 27, with which the bifurcated end of a lever 28 engages. This lever is connected up by any suitable mechanism of the known type to a lever in proximity to the chauffeur's seat and when this is operated the coupling members 14, 24 will be moved to the right of Fig. 1, thus compressing the spring 13 and uncoupling the friction rings $9^\times$, $24^\times$ of the coupling and disengaging the shaft 2 from the driving mechanism, so that the motor may run with free wheels.

The housing 11 contains the whole mechanism and is provided with a suitable slot 17 to allow the passage of the driving shaft 1 and the movement of the housing on the same. This housing is provided at opposite sides with dovetail projections 18, which engage corresponding grooves of sliding blocks 19, on the opposite sides of which said blocks dovetail projections 21 are provided at right angles to the said dovetail projections 18 and adapted to engage corresponding grooves of the car frame 22 (Fig. 2). Thus it will be seen that movements may be imparted to the housing 11, by suitable lever mechanism, or the like, controlled from the chauffeur's seat and in proximity to the same, in directions both parallel to and transversely with the axis of the driving shaft. Lever mechanism 20, 20× to effect these movements of the housing is indicated in Fig. 4, but it is immaterial as far as the present invention is concerned, any suitable mechanism being applicable. As will be readily understood, by these movements of the housing 11, either one of the gears 4, 5 and 6 may be brought into engagement with the driving pinion 3, or the latter may be engaged by the coupling clutch 7 (Fig. 3). In order to reverse the direction of motion of the car the housing is adjusted so that the pinion 3 comes into engagement with the gear 8.

The brake mechanism consists of a brake band 23 advantageously arranged on the outside of the coupling sleeve 24 which brake may be operated by means of the known lever mechanism 29 on the housing 11, from the hand lever in proximity to the chauffeur's seat. As is usual in brakes of this kind one end of the band 23 is secured to a part of the housing while the other end is secured to rocking part 29 so that when said part 29 is rocked the band is caused to grip the sleeve 24.

In order to secure the housing 11 in its various positions, against unintentional displacement, suitable arresting devices may be employed. For instance as illustrated in Figs. 4 and 5, spring pressed balls 30 may be employed which are located in the dovetail grooves while recesses 31 are formed in the contacting surface of the corresponding dovetail projection, so that the said balls will spring into the corresponding recess, when the housing has been properly adjusted. Thus one recess is provided for each position of the housing in the horizontal and in the vertical adjustment. The universal joint 32 must be arranged in some suitable manner to allow of the axial movement of the housing 11, for instance as shown the forks may be prolonged, but this feature is not a part of the present invention. The housing 11 might be guided in other suitable ways and the hollow body 9 might be provided with more steps for further variation of speed. It will be evident that instead of moving the housing 11 vertically to effect the engagement with the pinion 3 of the rings of teeth 4, 5 and 6 it might also be moved horizontally in a transverse direction.

From the above description it will be clear that in case of defect the housing with the whole mechanism can be easily removed and replaced by a reserve one.

I claim:

1. In a driving gearing, the combination of a housing, change speed gears centrally mounted therein, a reversing gear mounted in the housing to one side thereof, a coupling member and means for coupling the same to the said change speed gears, braking means for said coupling member, a driving shaft, and means for moving said housing in directions parallel to and transversely across the said driving shaft.

2. In combination with a driving shaft and a driven shaft, a housing, means for moving the housing parallel to and transversely of the driving shaft, a rotatable body within the housing having internal gears fixed therein, a pinion on the driving shaft adapted to engage with said gears, and coupling means for connecting said body with the driven shaft.

3. In combination with a driving shaft and a driven shaft, a housing, a rotatable body therein having interior rings of teeth, of different diameters, a pinion on the driving shaft adapted to engage with said teeth, coupling means for connecting said body with the driven shaft, said pinion on the driving shaft having holes therein and the said body having lugs thereon adapted to be engaged by said holes, and means for moving the housing in relation to the driving shaft.

4. In combination with a driving shaft and a driven shaft, a housing, a rotatable body therein having interior rings of teeth of different diameters, a pinion on the driving shaft adapted to engage with said teeth, coupling means for connecting the body with the driven shaft, a reversing pinion in the housing on one side thereof and engaging with one of the rings of teeth, and means for moving the housing in relation to the driving shaft to bring the pinion thereon in engagement with the desired ring of teeth or with the reversing pinion.

5. In combination with a driving shaft and a driven shaft, a housing, a rotatable body therein having interior rings of teeth of different diameters, coupling means for connecting the body with the driven shaft, a pinion on the driving shaft adapted to engage with the rings of teeth, guide blocks at each side of the housing, projections on the housing engaging with said blocks to permit movement of the housing in one direction on said blocks and guide means for said blocks to permit movement thereof in a direction at right angles to the movement of the said housing on the said blocks.

In testimony whereof I affix my signature in the presence of two witnesses.

TH. H. M. VAN SWIETEN.

Witnesses:
W. A. MANICE,
W. FRAKER.